(12) United States Patent
Nito

(10) Patent No.: US 10,999,453 B2
(45) Date of Patent: May 4, 2021

(54) MOTOR CONTROL DEVICE, SHEET CONVEYING APPARATUS, AND IMAGE FORMING APPARATUS

(71) Applicant: CANON KABUSHIKI KAISHA, Tokyo (JP)

(72) Inventor: Yuta Nito, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/834,996

(22) Filed: Mar. 30, 2020

(65) Prior Publication Data
US 2020/0329159 A1    Oct. 15, 2020

(30) Foreign Application Priority Data

Apr. 15, 2019 (JP) .............................. JP2019-077413

(51) Int. Cl.
*H04N 1/00* (2006.01)
*B65H 5/06* (2006.01)

(52) U.S. Cl.
CPC .......... *H04N 1/00087* (2013.01); *B65H 5/06* (2013.01); *H04N 1/00034* (2013.01); *H04N 1/00652* (2013.01); *B65H 2515/32* (2013.01)

(58) Field of Classification Search
CPC ........ B65H 5/06; B65H 2515/32; B65H 7/02; B65H 2515/704; B65H 2515/70; B65H 2515/71; B65H 7/06; B65H 7/20; B65H 2511/514; B65H 2511/52; B65H 2601/11; B65H 2701/1311; B65H 2701/1313; B65H 3/0684; B65H 7/04; B65H 7/08; H04N 1/00602; H04N 2201/0094; H04N 5/217; H04N 5/335; H04N 1/00652; H04N 2201/0081; H04N 1/00; H04N 1/00034; H04N 1/00087; H04N 1/0057; H04N 1/00588; H04N 1/00604; H04N 1/0062; H04N 1/00631; H04N 1/00798;
(Continued)

(56) References Cited

U.S. PATENT DOCUMENTS 9,952,545 B2 *  4/2018  Nito ......................... H02P 8/14
10,141,879 B2 * 11/2018  Kitamura ................ H02P 21/22
(Continued)

FOREIGN PATENT DOCUMENTS

JP    2016-46859 A    4/2016
JP    2018-64397 A    4/2018

*Primary Examiner* — Negussie Worku
(74) *Attorney, Agent, or Firm* — Canon U.S.A., Inc. I.P. Division

(57) ABSTRACT

A motor control device includes a phase determiner, a detector, and a controller configured to control the driving current so that a deviation between a value of a torque current component of the driving current detected by the detector and a target value of the torque current component is reduced, and perform field weakening for weakening an intensity of magnetic flux through the winding. In a state where a value corresponding to a rotational velocity is greater than a first predetermined value, the controller sets a degree of the field weakening to a first degree in a case where the value of the torque current component is greater than a second predetermined value, and sets the degree of the field weakening to a second degree smaller than the first degree in a case where the value of the torque current component is smaller than the second predetermined value.

20 Claims, 8 Drawing Sheets

(58) Field of Classification Search
CPC .. H04N 1/00899; H04N 1/00567; H04N 1/23; H04N 1/2323; H04N 5/23248; H04N 5/23287
USPC .......................................................... 358/1.1
See application file for complete search history.

(56) References Cited

U.S. PATENT DOCUMENTS

| | | | |
|---|---|---|---|
| 10,239,856 B2* | 3/2019 | Winssinger | A61P 1/16 |
| 10,305,402 B2* | 5/2019 | Takatsu | H04N 1/00588 |
| 10,305,406 B2* | 5/2019 | Sato | H04N 1/00798 |
| 10,547,263 B2* | 1/2020 | Sato | B65H 3/0669 |
| 10,602,009 B2* | 3/2020 | Nito | H02P 1/04 |
| 10,637,382 B2* | 4/2020 | Takatsu | H02P 8/12 |
| 2003/0178965 A1 | 9/2003 | Kuwano | |
| 2007/0013799 A1* | 1/2007 | Hirota | H04N 5/217 |
| | | | 348/311 |

* cited by examiner

MOTOR CONTROL DEVICE, SHEET CONVEYING APPARATUS, AND IMAGE FORMING APPARATUS

BACKGROUND

Field

The present disclosure relates to a motor control device for controlling the driving of a motor, a sheet conveying apparatus, and an image forming apparatus.

Description of the Related Art

There is known, as a typical method for controlling a motor, a method termed vector control for controlling a motor by controlling current values in a rotating coordinate system based on the rotational phase of a rotor of the motor is known as discussed in United States Patent Application Publication No. 20030178965. Specifically, there is known a method for controlling a motor by performing phase feedback control for controlling current values in a rotating coordinate system so that the deviation between the instruction phase and the actual rotational phase of a rotor becomes small. There is also known a method for controlling a motor by performing velocity feedback control for controlling current values in a rotating coordinate system so that the deviation between an instruction velocity and an actual rotational velocity of a rotor becomes small.

In the vector control, a driving current to be supplied to a winding of the motor is represented by a current component that generates a torque for rotating the rotor (a torque current component), and a current component that influences the intensity of the magnetic flux through the winding (an excitation current component). The value of the torque current component is controlled according to a change in a load torque applied to the rotor, thus efficiently generating a torque required for the rotation of the rotor. As a result, an increase in the motor sound and an increase in power consumption due to an excess torque are prevented. Moreover, a situation is prevented where, due to the fact that the load torque applied to the rotor exceeds an output torque corresponding to the driving current supplied to the winding of the motor, the rotor goes out of synchronization with an input signal, and the motor enters the state where the motor is out of control (a step-out state). When the vector control is performed, normally, the value of the excitation current component is controlled to be 0. This prevents an increase in power consumption.

In a winding in each phase of a motor, an inductive voltage is generated by the rotation of a rotor. If the inductive voltage is generated in the winding of the motor, a voltage that can be applied to the winding of the motor becomes small. More specifically, if the voltage of a power supply that applies a voltage to the winding of the motor is 24 V, for example, a voltage obtained by subtracting the inductive voltage generated in the winding from the power supply voltage (24 V) is the voltage that can be applied to the winding. Thus, the voltage that can be applied to the winding becomes smaller than 24 V, due to the inductive voltage generated in the winding. The faster the rotational velocity of the rotor is, the greater the magnitude of the inductive voltage is. Thus, the faster the rotational velocity of the rotor is, the smaller the voltage that can be applied to the winding of the motor is. If the voltage that can be applied to the winding of the motor becomes small, a torque that can be applied to the rotor (hereinafter referred to as an "output-possible torque") also becomes small.

In an image forming apparatus, for example, a load torque applied to a rotor of a motor may increase due to the degradation of a load as a driving target of the motor over time. If the load torque becomes greater than an output-possible torque, the rotor stops rotating.

SUMMARY

The present disclosure features preventing rotation of a rotor from stopping.

According to an aspect of the present disclosure, a motor control device includes a phase determiner configured to determine a rotational phase of a rotor of a motor, a detector configured to detect a driving current flowing through a winding of the motor, and a controller configured to control the driving current flowing through the winding so that a deviation between a value of a torque current component of the driving current detected by the detector and a target value of the torque current component is reduced, and perform field weakening for weakening an intensity of magnetic flux through the winding by controlling a value of an excitation current component of the driving current flowing through the winding, the target value of the torque current component being set so that a deviation between an instruction phase representing a target phase of the rotor and the rotational phase determined by the phase determiner is reduced, the torque current component being a current component that is represented in a rotating coordinate system based on the rotational phase determined by the phase determiner and generates a torque in the rotor, and the excitation current component being a current component that is represented in the rotating coordinate system and influences the intensity of the magnetic flux through the winding. In a state where a value corresponding to a rotational velocity of the rotor is greater than a first predetermined value, the controller sets a degree of the field weakening to a first degree in a case where the value of the torque current component of the driving current detected by the detector is greater than a second predetermined value, and the controller sets the degree of the field weakening to a second degree smaller than the first degree in a case where the value of the torque current component of the driving current detected by the detector is smaller than the second predetermined value.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings. The shapes and the relative arrangement of components described in these exemplary embodiments, however, should be appropriately changed depending on the configuration of an apparatus to which the present disclosure is applied and various conditions, and the scope of the present disclosure is not limited to the following exemplary embodiments. In the following description, a case will be described where a motor control device is provided in an image forming apparatus. The motor control device, however, is provided not only in an image forming apparatus. For example, the motor control device is also used in a sheet conveying apparatus that conveys a sheet, such as a recording medium or a document.

<Image Forming Apparatus>

Figure 1:
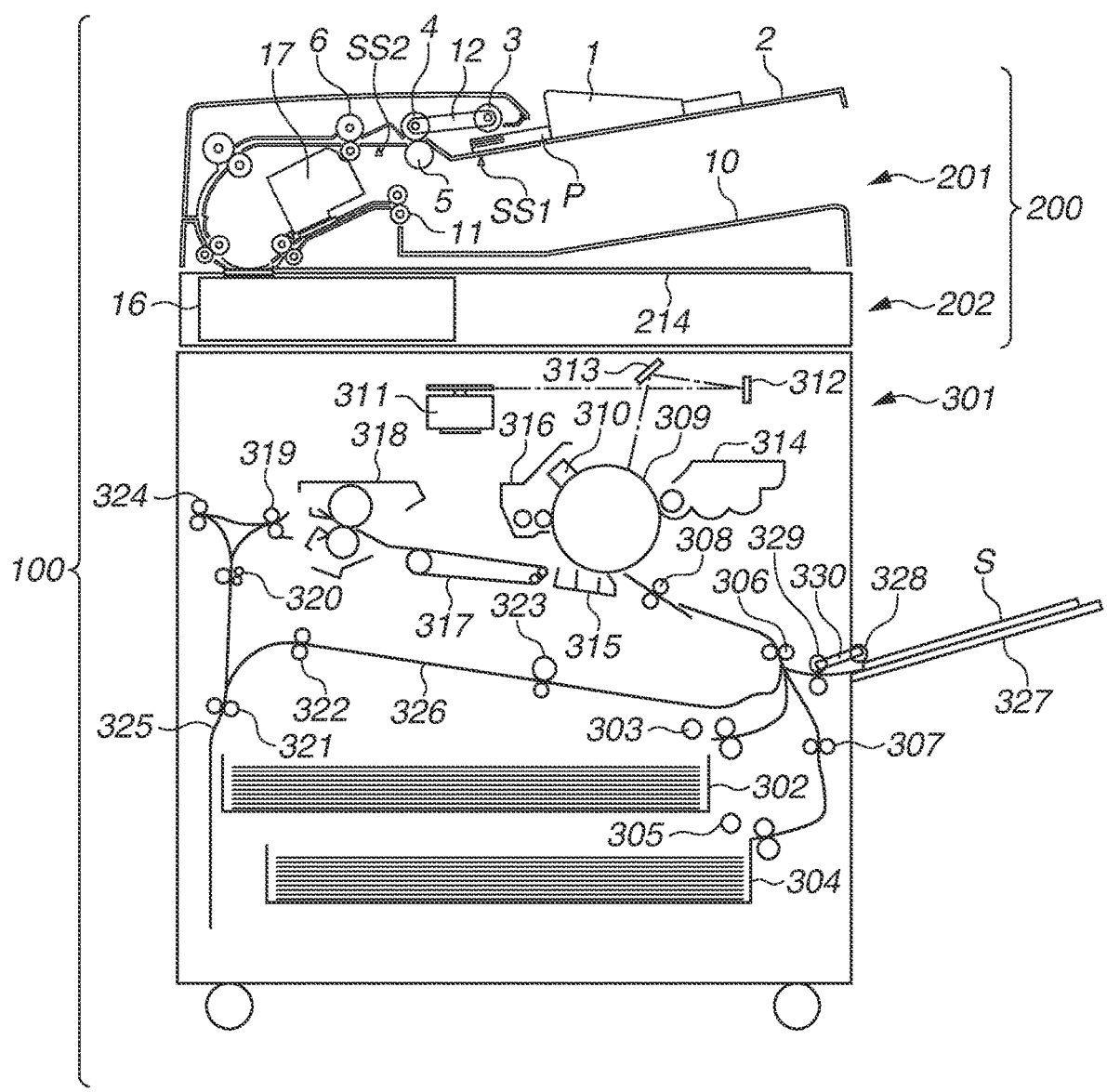
FIG. 1 is a sectional view illustrating an image forming apparatus according to an exemplary embodiment.

An exemplary embodiment of the present disclosure will be described below. FIG. 1 is a sectional view illustrating the configuration of a monochrome electrophotographic copying machine (hereinafter referred to as "image forming apparatus") 100 that includes a sheet conveying apparatus to be exemplified in the present exemplary embodiment. The image forming apparatus 100 is not limited to a copying machine, and may be, for example, a facsimile apparatus, a printing machine, or a printer. A recording method is not limited to an electrophotographic method, and may be, for example, an inkjet method. The format of the image forming apparatus 100 may be either of monochrome and color formats.

The configuration and the function of the image forming apparatus 100 will be described below with reference to FIG. 1. As illustrated in FIG. 1, the image forming apparatus 100 includes a document reading apparatus 200 and an image printing apparatus 301.

<Document Reading Apparatus>

In the document reading apparatus 200, a document feeding apparatus 201 is provided that feeds a document to a reading position. Documents P stacked in a document stacking unit 2 of the document feeding apparatus 201 are fed one by one by a pickup roller 3. Each document P is then conveyed by a sheet feeding roller 4. At a position opposed to the sheet feeding roller 4, a separation roller 5 is provided that is in pressure contact with the sheet feeding roller 4. The separation roller 5 is configured to rotate if a load torque greater than or equal to a predetermined torque is applied to the separation roller 5. The separation roller 5 has the function of separating two sheets of a document fed in an overlapping state.

The pickup roller 3 and the sheet feeding roller 4 are linked together by a swinging arm 12. The swinging arm 12 is supported by the rotating shaft of the sheet feeding roller 4 so that the swinging arm 12 can pivot about the rotating shaft of the sheet feeding roller 4.

The document P is conveyed by, for example, the sheet feeding roller 4 and discharged to a sheet discharge tray 10 by sheet discharge rollers 11. In the document stacking unit 2, a document set sensor SS1 is provided that detects whether the documents P are stacked in the document stacking unit 2 as illustrated in FIG. 1. In a conveying path through which each document P passes, a sheet sensor SS2 is provided that detects the front end of the document P (detects the presence or absence of the document P).

In the document reading apparatus 202, a document reading unit 16 is provided that reads an image on a first surface of the conveyed document P. Image information read by the document reading unit 16 is output to the image printing apparatus 301.

In the document reading apparatus 200, a document reading unit 17 is provided that reads an image on a second surface of the conveyed document P. Image information read by the document reading unit 17 is output to the image printing apparatus 301 as in the method described for the document reading unit 16.

As described above, a document is read. That is, the document feeding apparatus 201 and a reading apparatus 202 function as the document reading apparatus 200.

Document reading modes include a first reading mode and a second reading mode. In the first reading mode, an image of a document conveyed by the above method is read. In the second reading mode, the document reading unit 16 moving at a constant velocity reads an image of a document placed on a document glass 214 of the reading apparatus 202. Normally, an image of a sheet-like document is read in the first reading mode, and an image of a bound document, such as a book and a booklet, is read in the second reading mode.

The image printing apparatus 301 includes therein sheet holding trays 302 and 304. Different types of recording media can be held in the sheet holding trays 302 and 304. For example, A4-size plain paper is held in the sheet holding tray 302, and A4-size thick paper is held in the sheet holding tray 304. In each of the recording media, an image is to be formed by the image forming apparatus 100. For example, the recording media include a sheet, a resin sheet, cloth, an overhead projector (OHP) sheet, and a label.

A recording medium held in the sheet holding tray 302 is fed by a pickup roller 303 and sent out to registration rollers 308 by conveying rollers 306. A recording medium held in the sheet holding tray 304 is fed by a pickup roller 305 and sent out to the registration rollers 308 by conveying rollers 307 and the conveying rollers 306.

An image signal output from the document reading apparatus 200 is input to an optical scanning device 311 including a semiconductor laser and a polygon mirror. The outer peripheral surface of a photosensitive drum 309 is charged by a charging device 310. After the outer peripheral surface of the photosensitive drum 309 is charged, laser light based on the image signal input from the document reading apparatus 200 to the optical scanning device 311 is emitted from the optical scanning device 311 to the outer peripheral surface of the photosensitive drum 309 via the polygon mirror and mirrors 312 and 313. Accordingly, an electrostatic latent image is formed on the outer peripheral surface of the photosensitive drum 309.

Subsequently, the electrostatic latent image is developed with toner in a developing device 314, thus forming a toner image on the outer peripheral surface of the photosensitive drum 309. The toner image formed on the photosensitive drum 309 is transferred onto the recording medium by a transfer charging device 315 provided at a position (a transfer position) opposed to the photosensitive drum 309. The registration rollers 308 send the recording medium into the transfer position in accordance with the transfer timing when the transfer charging device 315 transfers the image onto the recording medium.

The recording medium onto which the toner image has been transferred as described above is sent into a fixing device 318 by a conveying belt 317 and is heated and pressurized by the fixing device 318, thus fixing the toner image to the recording medium. In this manner, an image is formed on a recording medium by the image forming apparatus 100. The photosensitive drum 309, the developing device 314, and the transfer charging device 315 are included in an image forming unit.

In a case where an image is formed in a one-sided printing mode, the recording medium having passed through the fixing device 318 is discharged to a sheet discharge tray (not illustrated) by sheet discharge rollers 319 and 324. In a case where an image is formed in a two-sided printing mode, a fixing process is performed on a first surface of the recording medium by the fixing device 318, and the recording medium is then conveyed to a reverse path 325 by the sheet discharge rollers 319, conveying rollers 320, and reverse rollers 321. The recording medium is then conveyed to the registration rollers 308 again by conveying rollers 322 and 323, and an image is formed on a second surface of the recording medium through the above method. The recording medium is discharged to the sheet discharge tray (not illustrated) by the sheet discharge rollers 319 and 324.

In a case where the recording medium, on the first surface of which an image is formed, is discharged in a face-down state to outside the image forming apparatus 100, the recording medium having passed through the fixing device 318 is conveyed through the sheet discharge rollers 319 in a direction toward the conveying rollers 320. Immediately before the rear end of the recording medium passes through a nip portion of the conveying rollers 320, the rotation of the conveying rollers 320 is reversed, thus discharging the recording medium to outside the image forming apparatus 100 via the sheet discharge rollers 324 in the state where the first surface of the recording medium faces down.

The foregoing is the description of the configuration and the function of the image forming apparatus 100. Various rollers, such as the pickup rollers 3, 303, and 305 and the registration rollers 308, the photosensitive drum 309, the developing device 314, the conveying belt 317, and the document reading unit 16 correspond to loads according to the present disclosure. The motor control device according to the present exemplary embodiment can be applied to motors for driving these loads. A rotating member for conveying a recording medium is included in a conveying unit.

Figure 2:
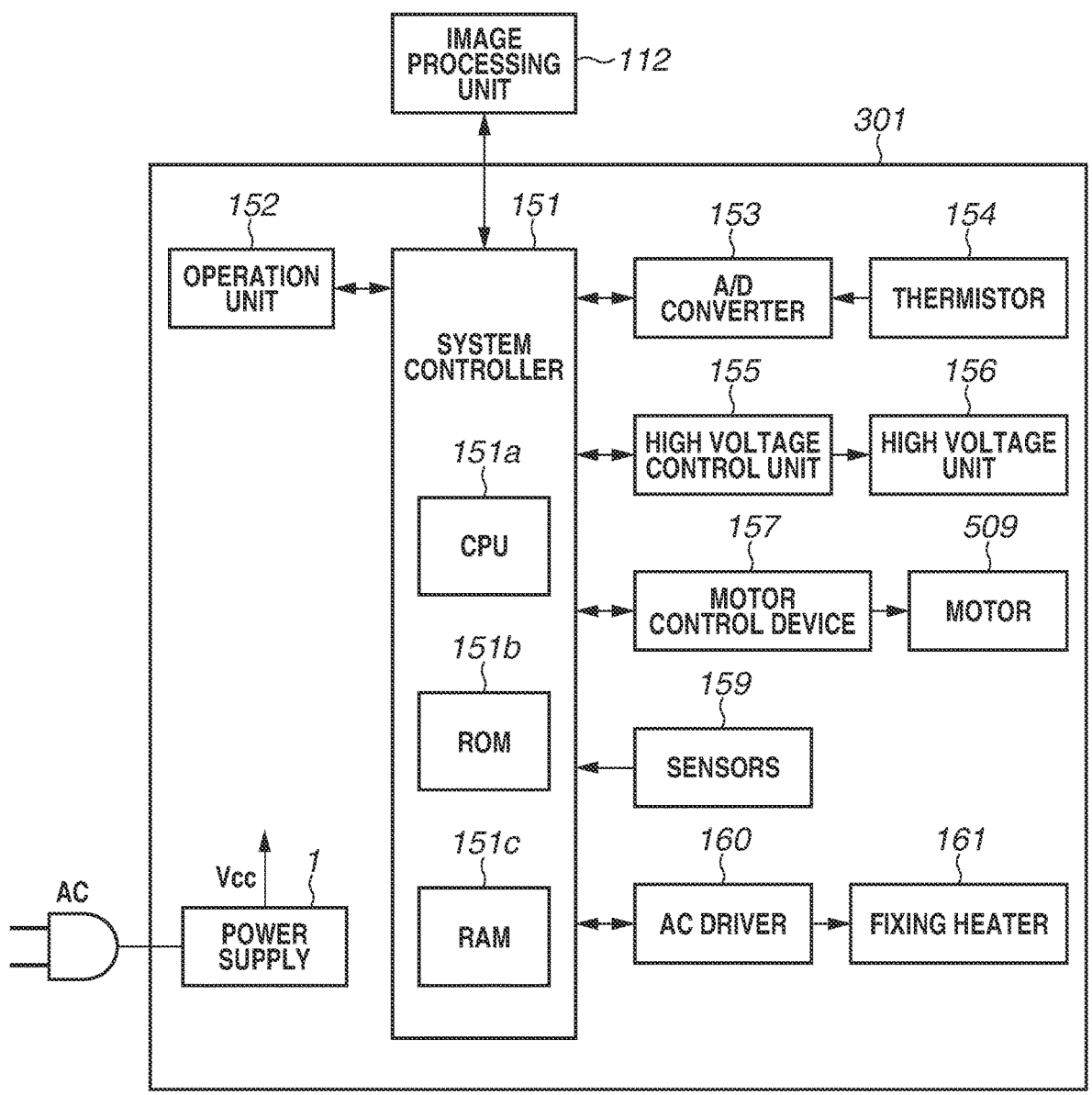
FIG. 2 is a block diagram illustrating a control configuration of the image forming apparatus.

FIG. 2 is a block diagram illustrating an example of the control configuration of the image forming apparatus 100. The image forming apparatus 100 includes a power supply 1 as illustrated in FIG. 2. The power supply 1 is connected to an alternating-current (AC) power supply, and various devices within the image forming apparatus 100 operate with power output from the power supply 1. A system controller 151 includes a central processing unit (CPU) 151a, a read-only memory (ROM) 151b, and a random-access memory (RAM) 151c as illustrated in FIG. 2. The system controller 151 is connected to an image processing unit 112, an operation unit 152, an analog-to-digital (A/D) converter 153, a high voltage control unit 155, a motor control device 157, sensors 159, and an AC driver 160. The system controller 151 can transmit and receive data and a command to and from the units connected to the system controller 151.

The CPU 151a reads and executes various programs stored in the ROM 151b, thus executing various sequences related to a predetermined image forming sequence.

The RAM 151c is a storage device. The RAM 151c stores various types of data, such as a setting value for the high voltage control unit 155, an instruction value for the motor control device 157, and information received from the operation unit 152.

The system controller 151 transmits, to the image processing unit 112, setting value data for the various devices provided within the image forming apparatus 100. The setting valued data is to be required for image processing in the image processing unit 112. Further, the system controller 151 receives signals from the sensors 159, and sets a setting value for the high voltage control unit 155 based on the received signals.

According to the setting value set by the system controller 151, the high voltage control unit 155 supplies a required voltage to a high voltage unit 156 (the charging device 310, the developing device 314, and the transfer charging device 315).

The motor control device 157 controls a motor 509 based on an instruction output from the CPU 151a. Only the motor 509 is illustrated as a motor for driving a load in FIG. 2. In practice, a plurality of motors is provided in the image forming apparatus 100. Alternatively, a configuration may be employed in which a single motor control device controls a plurality of motors. While only a single motor control device is provided in FIG. 2, a plurality of motor control devices is provided in practice.

The power supply 1 supplies a voltage Vcc to a full-bridge circuit 50 provided in the motor control device 157. The full-bridge circuit 50 will be described below.

The A/D converter 153 receives a detected signal detected by a thermistor 154 for detecting the temperature of a fixing heater 161. Then, the A/D converter 153 converts the detected signal from an analog signal to a digital signal and transmits the digital signal to the system controller 151. The system controller 151 controls the AC driver 160 based on the digital signal received from the A/D converter 153. The AC driver 160 controls the fixing heater 161 so that the temperature of the fixing heater 161 becomes a temperature required to perform a fixing process. The fixing heater 161 is a heater for use in the fixing process and is included in the fixing device 318.

The system controller 151 controls the operation unit 152 to display, on a display unit provided in the operation unit 152, an operation screen for a user to set the type of a recording medium to be used (hereinafter referred to as the "paper type"). The system controller 151 receives information set by the user from the operation unit 152, and controls an operation sequence of the image forming apparatus 100 based on the information set by the user. The system controller 151 transmits, to the operation unit 152, information indicating the state of the image forming apparatus 100. The information indicating the state of the image forming apparatus 100 is, for example, information regarding the number of images to be formed, the progress state of an image forming operation, and a jam or multi-feed of a sheet in the image printing apparatus 301 and the document feeding apparatus 201. The operation unit 152 displays on the display unit the information received from the system controller 151.

As described above, the system controller 151 controls the operation sequence of the image forming apparatus 100.

[Motor Control Device]

Next, the motor control device according to the present exemplary embodiment will be described below. The motor control device according to the present exemplary embodiment controls a motor with vector control.

<Vector Control>

Figure 3:
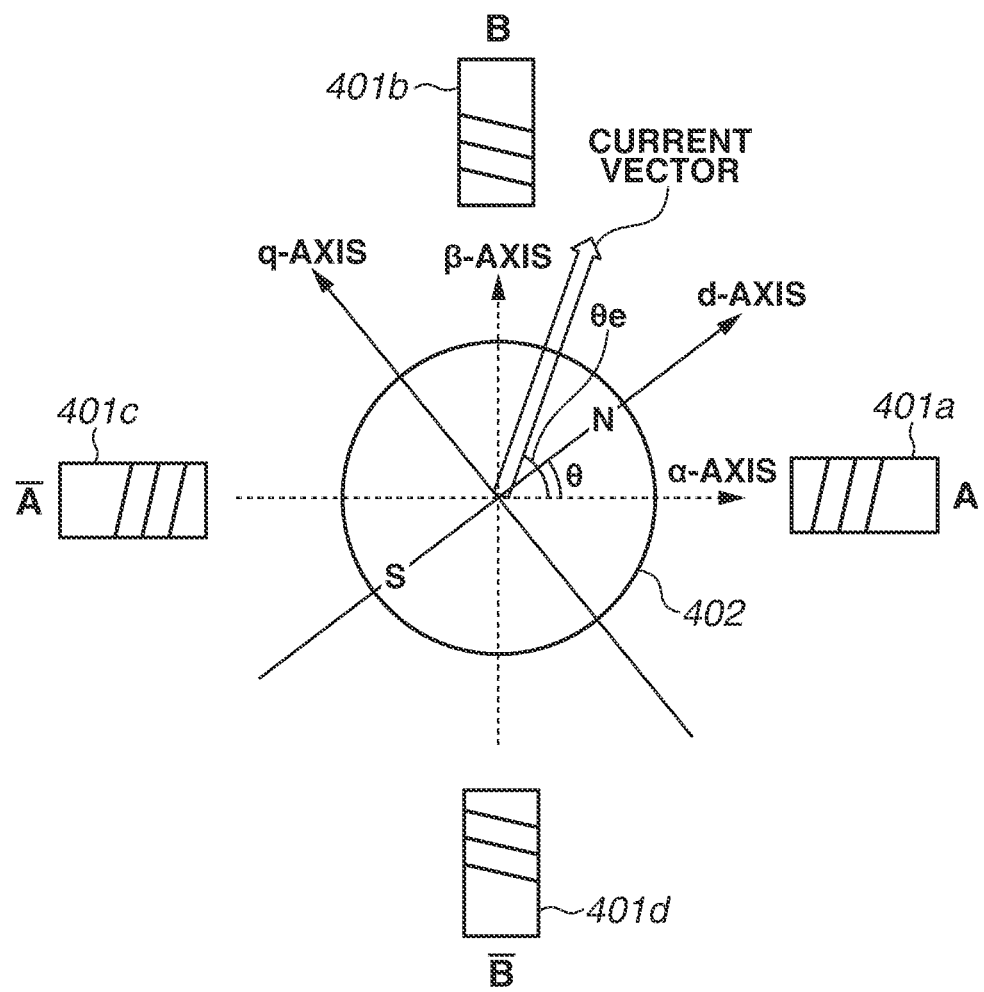
FIG. 3 is a diagram illustrating relationships between a two-phase motor including an A-phase and a B-phase, and a d-axis and a q-axis in a rotating coordinate system.
Figure 4:
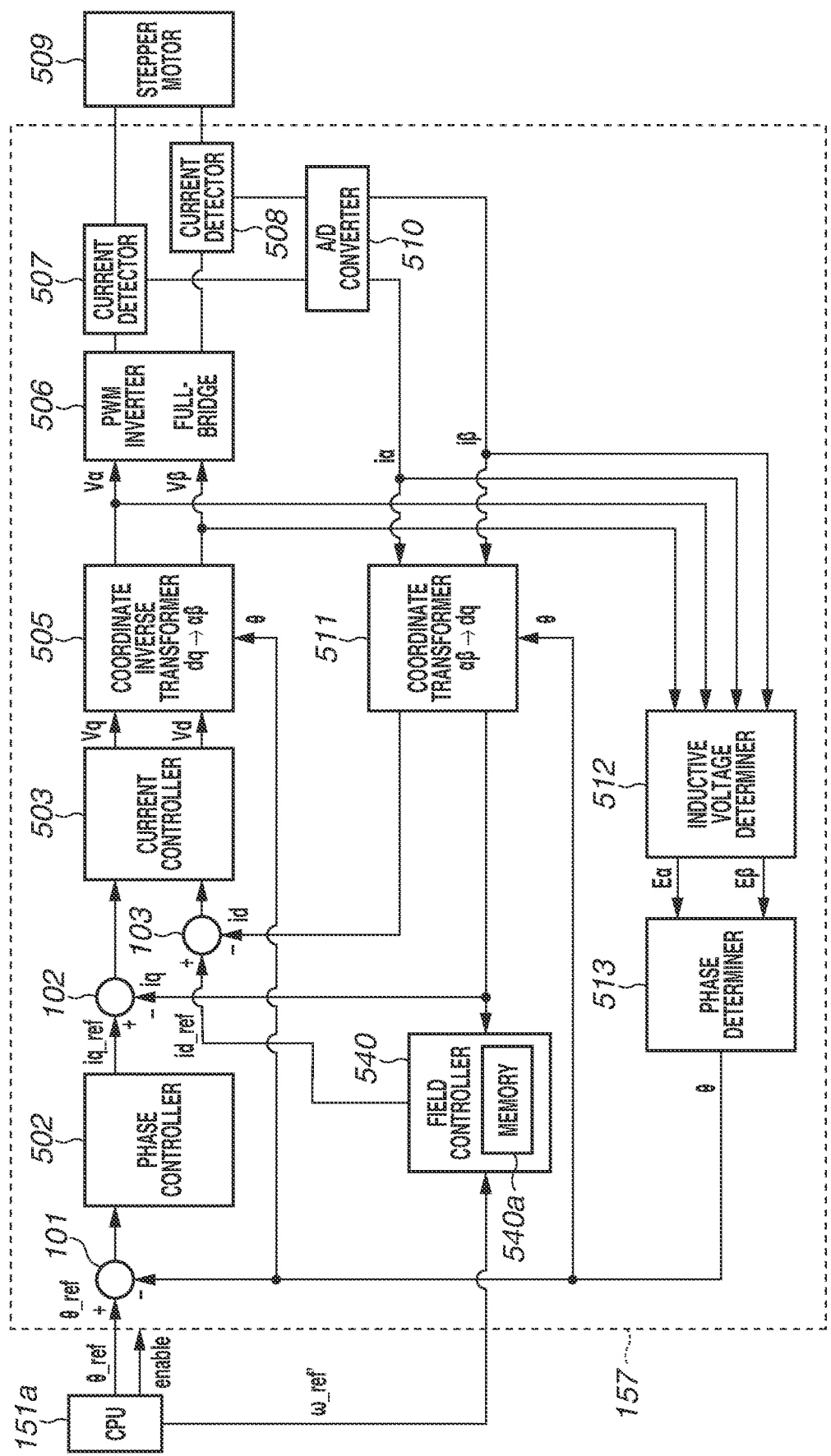
FIG. 4 is a block diagram illustrating a configuration of a motor control device according to an exemplary embodiment.

A description will be provided of a method in which the motor control device 157 according to the present exemplary embodiment performs vector control, with reference to FIGS. 3 and 4. In a motor in the following description, a sensor, such as a rotary encoder for detecting the rotational phase of a rotor of the motor, is not provided. Alternatively, a configuration may be employed in which a sensor, such as a rotary encoder, is provided in the motor.

FIG. 3 is a diagram illustrating the relationship between a stepper motor (hereinafter referred to as "motor") 509 that has two phases including an A-phase (a first phase) and a B-phase (a second phase), and a rotating coordinate system represented by a d-axis and a q-axis. In a stationary coordinate system in FIG. 3, an α-axis that is an axis corresponding to windings in an A-phase, and a β-axis that is an axis corresponding to windings in a B-phase are defined. In FIG. 3, the d-axis is defined along the direction of the magnetic flux created by the magnetic poles of a permanent magnet used in a rotor 402, and the q-axis is defined along a direction rotated 90 degrees counterclockwise from the d-axis (a direction orthogonal to the d-axis). The angle between the a-axis and the d-axis is defined as θ, and the rotational phase of the rotor 402 is represented by the angle θ. In the vector control, a rotating coordinate system based on the rotational phase θ of the rotor 402 is used. More specifically, in the vector control, a q-axis component (a torque current component) and a d-axis component (an excitation current component), which are current components in the rotating coordinate system of a current vector corresponding to a driving current flowing through each winding, are used. The q-axis component (the torque current component) generates a torque in the rotor 402, and the d-axis component (the excitation current component) influences the intensity of the magnetic flux through the winding.

The vector control is a control method for controlling a motor by performing phase feedback control for controlling the value of a torque current component and the value of an excitation current component so that the deviation between the instruction phase indicating the target phase of a rotor and the actual rotational phase of the rotor becomes small. There is another method for controlling a motor by performing velocity feedback control for controlling the value of the torque current component and the value of the excitation current component so that the deviation between the instruction velocity indicating the target velocity of a rotor and an actual rotational velocity of the rotor becomes small.

FIG. 4 is a block diagram illustrating an example of the configuration of the motor control device 157 that controls the motor 509. The motor control device 157 includes at least one application-specific integrated circuit (ASIC) and executes functions described below.

As illustrated in FIG. 4, the motor control device 157 includes, as a circuit for performing the vector control, a phase controller 502, a current controller 503, a coordinate inverse transformer 505, a coordinate transformer 511, and a pulse-width modulation (PWM) inverter 506. The coordinate transformer 511 performs coordinate transformation on current vectors corresponding to driving currents flowing through the windings in the A-phase and the B-phase of the motor 509, from the stationary coordinate system represented by the α-axis and the β-axis to the rotating coordinate system represented by the q-axis and the d-axis. Accordingly, the driving currents flowing through the windings are represented by the current value of the q-axis component (a q-axis current) and the current value of the d-axis component (a d-axis current), which are current values in the rotating coordinate system. The q-axis current corresponds to a torque current that generates a torque in the rotor 402 of the motor 509. The d-axis current corresponds to an excitation current that influences the intensity of the magnetic flux through each winding of the motor 509. The motor control device 157 can independently control the q-axis current and the d-axis current. Accordingly, the motor control device 157 controls the q-axis current according to a load torque applied to the rotor 402, thus efficiently generating a torque required for the rotation of the rotor 402. That is, in the vector control, the magnitude of the current vector illustrated in FIG. 3 changes according to the load torque applied to the rotor 402.

The motor control device 157 determines the rotational phase θ of the rotor 402 of the motor 509 through a method described below, and performs the vector control based on the determination result. The CPU 151a generates an instruction phase θ_ref representing the target phase of the rotor 402 in the motor 509 and outputs the instruction phase θ_ref to the motor control device 157.

A subtractor 101 calculates a deviation between the rotational phase θ of the rotor 402 of the motor 509 and the instruction phase θ_ref and outputs the deviation to the phase controller 502.

The phase controller 502 acquires the deviation output from the subtractor 101 in a predetermined time period T (e.g., 200 μs). The phase controller 502 generates a q-axis current instruction value iq_ref so that the deviation output from the subtractor 101 becomes small based on proportional control (P), integral control (I), and derivative control (D), and outputs the q-axis current instruction value iq_ref. More specifically, based on the P-control, the I-control, and the D-control, the phase controller 502 generates the q-axis current instruction value iq_ref so that the deviation output from the subtractor 101 is 0, and outputs the q-axis current instruction value iq_ref. The P-control is a control method for controlling the value of a target to be controlled, based on a value proportional to the deviation between an instruction value and an estimated value. The I-control is a control method for controlling the value of the target to be controlled, based on a value proportional to the time integral of the deviation between the instruction value and the estimated value. The D-control is a control method for controlling the value of the target to be controlled, based on a value proportional to a change over time in the deviation between the instruction value and the estimated value. The phase controller 502 according to the present exemplary embodiment generates the q-axis current instruction value iq_ref based on proportional-integral-derivative (PID) control. The method, however, is not limited thereto. For example, the phase controller 502 may generate the q-axis current instruction value iq_ref based on proportional-integral (PI) control.

Driving currents flowing through the windings in the A-phase and the B-phase of the motor 509 are detected by current detectors 507 and 508 and then converted from analog values to digital values by an A/D converter 510. In the present exemplary embodiment, the period in which the A/D converter 510 outputs the digital values is, for example, a period (e.g., 25 μs) shorter than the period T, in which the phase controller 502 acquires the deviation. The period, however, is not limited thereto.

The current values of the driving currents converted from the analog values to the digital values by the A/D converter 510 are represented as current values iα and iβ in the stationary coordinate system by the following formulas, using a phase θe of the current vector illustrated in FIG. 4. The phase θe of the current vector is defined as the angle between the α-axis and the current vector. I represents the magnitude of the current vector.

$$i\alpha = I^* \cos \theta e \quad (1)$$

$$i\beta = I^* \sin \theta e \quad (2)$$

The current values iα and iβ are input to the coordinate transformer 511 and an inductive voltage determiner 512.

The coordinate transformer 511 transforms the current values iα and iβ in the stationary coordinate system into a current value iq of the q-axis current and a current value id of the d-axis current in the rotating coordinate system by using the following formulas:

$$id = \cos \theta^* i\alpha + \sin \theta^* i\beta; \quad (3)$$

$$iq = -\sin \theta^* i\alpha + \cos \theta^* i\beta. \quad (4)$$

The q-axis current instruction value iq_ref output from the phase controller 502 and the current value iq output from the coordinate transformer 511 are input to a subtractor 102. The subtractor 102 calculates the deviation between the q-axis current instruction value iq_ref and the current value iq and outputs the calculated deviation to the current controller 503.

A d-axis current instruction value (target value) id_ref output from a field controller 540 and the current value id output from the coordinate transformer 511 are input to a subtractor 103. The subtractor 103 calculates the deviation between the d-axis current instruction value id_ref and the current value id and outputs the calculated deviation to the current controller 503. The field controller 540 will be described below.

The current controller 503 generates driving voltages Vq and Vd based on the PID control so that each of the deviations input to the current controller 503 becomes small. More specifically, the current controller 503 generates the driving voltages Vq and Vd so that each of the deviations becomes 0. The current controller 503 then outputs the driving voltages Vq and Vd to the coordinate inverse transformer 505. That is, the current controller 503 functions as a generation unit. The current controller 503 according to the present exemplary embodiment generates the driving voltages Vq and Vd based on the PID control. The method, however, is not limited thereto. For example, the current controller 503 may generate the driving voltages Vq and Vd based on the PI control.

The coordinate inverse transformer 505 inversely transforms the driving voltages Vq and Vd in the rotating coordinate system, which are output from the current controller 503, into driving voltages Vα and Vβ in the stationary coordinate system by using the following formulas:

$$V\alpha = \cos \theta^* Vd - \sin \theta^* Vq; \quad (5)$$

$$V\beta = \sin \theta^* Vd + \cos \theta^* Vq. \quad (6)$$

The coordinate inverse transformer 505 outputs the inversely transformed driving voltages Vα and Vβ to the inductive voltage determiner 512 and the PWM inverter 506.

Figure 5:
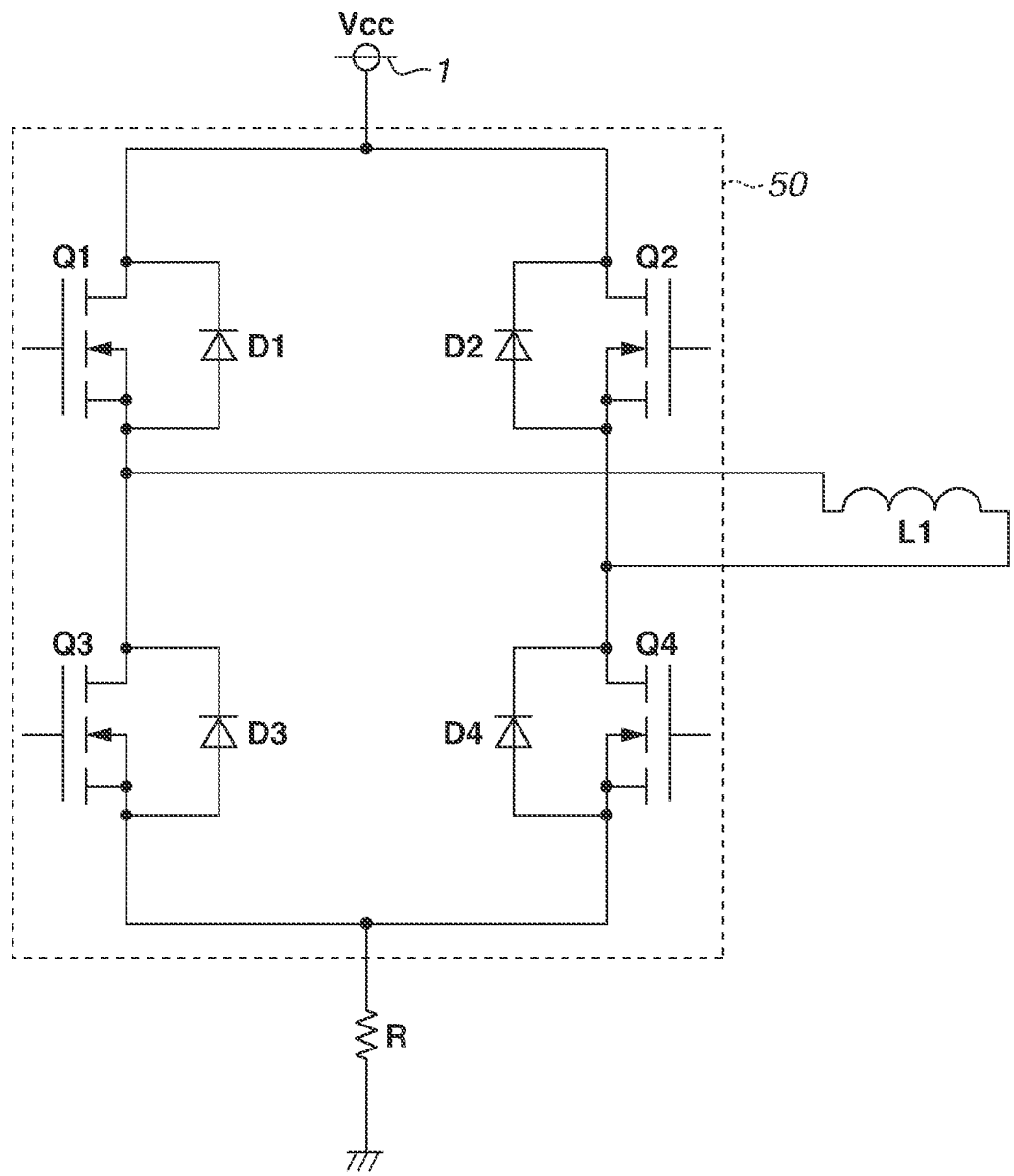
FIG. 5 is a diagram illustrating a configuration of a full-bridge circuit provided in a pulse-width modulation (PWM) inverter.

The PWM inverter 506 includes a full-bridge circuit. FIG. 5 is a diagram illustrating an example of the configuration of the full-bridge circuit 50 provided in the PWM inverter 506. As described above, the power supply 1 supplies the voltage Vcc to the full-bridge circuit 50. The full-bridge circuit 50 includes field-effect transistors (FETs) Q1 to Q4 as switching elements. A winding L1 of the motor 509 is connected to the full-bridge circuit 50.

The FETs Q1 to Q4 are driven by PWM signals based on the driving voltages Vα and Vβ input from the coordinate inverse transformer 505. Accordingly, the power supply 1 applies a voltage to the winding L1. Accordingly, the driving currents is and is according to the driving voltages Vα and Vβ are supplied to the winding L. That is, the PWM inverter 506 functions as a supply unit. In the present exemplary embodiment, the PWM inverter 506 includes a full-bridge circuit. Alternatively, the PWM inverter 506 may include a half-bridge circuit. The full-bridge circuit 50 is provided corresponding to each of the A-phase and the B-phase of the motor 509. In the present exemplary embodiment, a single power supply is provided for each of the A-phase and the B-phase. The configuration is not limited to this. The winding L1 in FIG. 5 is, in practice, a winding provided in the motor 509.

Next, a description will be provided of a method for determining the rotational phase θ. The rotational phase θ of the rotor 402 is determined using the values of inductive voltages Eα and Eβ induced in the windings in the A-phase and the B-phase of the motor 509 by the rotation of the rotor 402. The value of each inductive voltage is determined (calculated) by the inductive voltage determiner 512. More specifically, the inductive voltages Eα and Eβ are determined by the following formulas, based on the current values is and is input from the A/D converter 510 to the inductive voltage determiner 512 and the driving voltages Vα and Vβ input from the coordinate inverse transformer 505 to the inductive voltage determiner 512.

$$E\alpha = V\alpha - R^* i\alpha - L^* di\alpha/dt \quad (7)$$

$$E\beta = V\beta - R^* i\beta - L^* di\beta/dt \quad (8)$$

In these formulas, R represents winding resistance, and L represents winding inductance. The values of the winding resistance R and the winding inductance L are values specific to the motor 509 in use and are stored in advance in the ROM 151b or a memory (not illustrated) provided in the motor control device 157.

The inductive voltages Eα and Eβ determined by the inductive voltage determiner 512 are output to a phase determiner 513.

The phase determiner 513 determines the rotational phase θ of the rotor 402 of the motor 509 by the following formula based on the ratio between the inductive voltages Eα and Eβ output from the inductive voltage determiner 512.

$$\theta = \tan^{-1}(-E\beta/E\alpha) \quad (9)$$

In the present exemplary embodiment, the phase determiner 513 determines the rotational phase θ by performing calculation based on formula (9). The present disclosure, however, is not limited to this. For example, the phase determiner 513 may determine the rotational phase θ with reference to a table stored in the ROM 151b and illustrating the relationships between the inductive voltages Eα and Eβ, and the rotational phase θ corresponding to the inductive voltages Eα and Eβ.

The rotational phase θ of the rotor 402 obtained as described above is input to the subtractor 101, the coordinate inverse transformer 505, and the coordinate transformer 511.

The motor control device 157 repeatedly performs the above control.

As described above, the motor control device 157 according to the present exemplary embodiment performs the vector control for controlling current values in the rotating coordinate system using the phase feedback control so that the deviation between the instruction phase θ_ref and the rotational phase θ becomes small. The vector control is performed, and accordingly it is possible to prevent a motor from entering a step-out state and prevent an increase in the motor sound and an increase in power consumption due to an excess torque. The phase feedback control is performed, controlling the rotational phase of a rotor so that the rotational phase of the rotor becomes a desired phase. Thus, in an image forming apparatus, vector control using phase feedback control is applied to a motor for driving a load (e.g., a registration roller) for which the rotational phase of a rotor needs to be controlled with high accuracy, appropriately forming an image on a recording medium.

<Field Weakening>

Next, field weakening will be described. As described above, in a winding in each phase of a motor, an inductive voltage is generated by the rotation of a rotor. If the inductive voltage is generated in the winding of the motor, a voltage that can be applied to the winding of the motor (hereinafter referred to as an "available voltage") reduces. More specifically, if the voltage value of a voltage to be output from the power supply 1 is Vcc, available voltages Vα' and Vβ' are limited to values represented by the following formulas (10) and (11) due to the fact that the inductive voltage generates in the winding in each phase.

$$Vα'=Vcc-eα \quad (10)$$

$$Vβ'=Vcc-eβ \quad (11)$$

In these formulas, eα represents the amplitude of the inductive voltage Eα that sinusoidally changes. eβ represents the amplitude of the inductive voltage Eβ that sinusoidally changes.

The faster the rotational velocity of the rotor is, the greater an amplitude e of the inductive voltage which generates in the winding in each phase with the rotation of the rotor is. That is, the faster the rotational velocity of the rotor is, the smaller the available voltage is. If the available voltage becomes small, a torque T that can be applied to the rotor also becomes small.

The inductive voltage generates with a change in the magnetic flux through the winding. Thus, the excitation current component is controlled so that magnetic flux weaker than the magnetic flux of the rotor passes through the winding, and accordingly it is possible to prevent an increase in the magnitude of the inductive voltage to be generated in the winding. More specifically, the excitation current component is controlled to have a negative value, apparently weakening the intensity of the magnetic flux of the rotor. Thus, it is possible to cause magnetic flux weaker than the magnetic flux of the rotor to pass through the winding. This prevents an increase in the magnitude of the inductive voltage which generates in the winding and prevents a decrease in the available voltages Vα' and Vβ'. Accordingly, it is possible to prevent a decrease in output-possible torque is enabled. A technique as described above is termed field weakening. When the excitation current component has a negative value, the greater the absolute value of the excitation current component is, the more the output-possible torque can be prevented from becoming small.

Next, field weakening according to the present exemplary embodiment is described.

<Condition 1 for Performing Field Weakening>

If the following two conditions are satisfied, the motor control device 157 according to the present exemplary embodiment performs the field weakening.

First, the first condition for performing the field weakening will be described.

Figure 6:
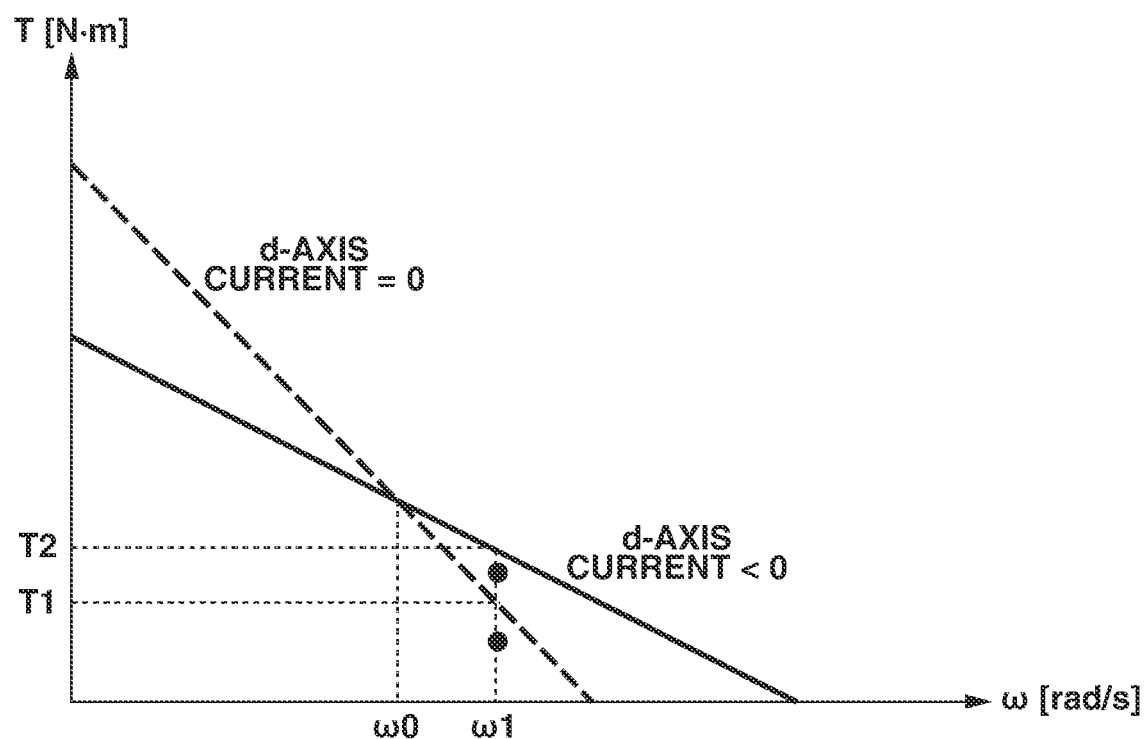
FIG. 6 is a diagram illustrating a relationship between an output-possible torque and a rotational velocity of a rotor.

FIG. 6 is a diagram illustrating the relationship between an output-possible torque T of the motor 509 and a rotational velocity w of the rotor 402. FIG. 6 illustrates an output-possible torque T-rotational velocity w characteristic in a case where the d-axis current is controlled to be 0 (a dashed line), and the output-possible torque T-rotational velocity w characteristic in a case where the d-axis current is controlled to have a negative value (a solid line). In FIG. 6, T1 represents an output-possible torque corresponding to a rotational velocity ω1 in a case where the field weakening is not performed, and T2 represents an output-possible torque corresponding to the rotational velocity ω1 in a case where the field weakening is performed. The output-possible torque—number-of-rotations characteristic illustrated in FIG. 6 is an example in the present exemplary embodiment, and is not limited to this.

As illustrated in FIG. 6, if the rotational velocity ω is less than ω0 (ω<ω0), the output-possible torque T in a case where the d-axis current is controlled to be 0 is greater than the output-possible torque T in a case where the d-axis current is controlled to have a negative value. That is, if the rotational velocity ω is less than ω0 (ω<ω0), it is possible to apply a greater torque to the rotor 402 in a case where the field weakening is not performed than in a case where the field weakening is performed.

As illustrated in FIG. 6, if the rotational velocity ω is greater than ω0 (ω>ω0), the output-possible torque T in a case where the d-axis current is controlled to have a negative value is greater than the output-possible torque T in a case where the d-axis current is controlled to be 0. That is, if the rotational velocity ω is greater than ω0 (ω>ω0), it is possible to apply a greater torque to the rotor 402 in a case where the field weakening is performed than in a case where the field weakening is not performed.

As described above, if the rotational velocity ω is less than ω0 (ω<ω0), it is possible to apply a greater torque to the rotor 402 in a case where the field weakening is not performed than in a case where the field weakening is performed. If the rotational velocity ω is greater than ω0 (ω>ω0), it is possible to apply a greater torque to the rotor 402 in a case where the field weakening is performed than in a case where the field weakening is not performed.

Thus, in the present exemplary embodiment, the first condition for performing the field weakening is that the rotational velocity ω of the rotor 402 is greater than or equal to ω0.

In the present exemplary embodiment, the CPU 151a calculates a rotational velocity ω_ref' as a substitute for the instruction velocity ω_ref based on the amount of change in the instruction phase θ_ref during a predetermined period and outputs the rotational velocity ω_ref' to the field controller 540, as illustrated in FIG. 4. The rotational velocity ω_ref' is calculated using the following formula (12):

$$ω=dθ/dt. \quad (12)$$

The field controller 540 determines whether the rotational velocity ω_ref' satisfies the following formula (13). A velocity threshold ωth (=ω0) is stored in the memory 540a.

$$ω\_ref' ≥ ωth \quad (13)$$

The greater the absolute value of the d-axis current is, the greater the current flowing through the winding is. That is, the value of the d-axis current is 0 in a case where the field weakening is not performed, whereas the value of the d-axis current is not 0 in a case where the field weakening is performed. Thus, if the field weakening is performed, power consumption increases as compared with a case where the field weakening is not performed.

For example, if a load torque $T_L$ applied to the rotor 402 of the motor 509 in the state where the motor 509 is driven at the velocity ω1 faster than the threshold ωth is smaller than the output-possible torque T1 ($T_L$<T1), the motor 509 can be driven with the field weakening not being performed. If only formula (13) is set as a condition for performing the field weakening, the field weakening is performed even though the motor 509 can be driven with the field weakening not being performed. Thus, power is unnecessarily consumed.

The load torque $T_L$ may increase due to the degradation over time of a load as a driving target of the motor 509. If the load torque $T_L$ enters the state where T1<$T_L$, the motor 509 cannot be driven with the field weakening not being performed.

In response, if the following condition is satisfied in addition to condition 1, the field weakening is performed in the present exemplary embodiment.

<Condition 2 for Performing Field Weakening>

The second condition for performing the field weakening will be described.

In the present exemplary embodiment, the current value iq output from the coordinate transformer 511 is input to the field controller 540. The current value iq is a value corresponding to the load torque applied to the rotor 402 of the motor 509 as illustrated in FIG. 4.

The field controller 540 determines whether the current value iq satisfies the following formula (14). A threshold iq1 is the current value iq corresponding to the torque T1 and is stored in the memory 540a.

$$iq \geq iq1 \quad (14)$$

If at least one of formulas (13) and (14) is not satisfied, the field controller 540 outputs 0 A as the d-axis current instruction value id_ref. That is, the field weakening is not performed.

If both formulas (13) and (14) are satisfied, the field controller 540 switches the d-axis current instruction value id_ref to be output, from 0 A to a negative value (e.g., −0.3 A) by gradually changing the d-axis current instruction value id_ref. Accordingly, the field weakening is performed.

The d-axis current instruction value id_ref is set to such a predetermined value that even if, among the types of recording media that can be conveyed, a recording medium (e.g., thick paper) for which the range of increase in the load torque is the greatest is conveyed, the load torque does not exceed the output-possible torque.

If the value of the d-axis current instruction value id_ref is set to a negative value, and the absolute value of the d-axis current instruction value id_ref is too large, the magnetic field which generates from the permanent magnet as the rotor 402 is excessively weakened. Accordingly, the torque which generates in the rotor 402 reduces. If the value of the d-axis current instruction value id_ref is set to a negative value, and the absolute value of the d-axis current instruction value id_ref is a value close to 0, the magnetic field which generates from the permanent magnet as the rotor 402 cannot be weakened. Accordingly, the inductive voltage which generates in the winding cannot be reduced. The negative value is predetermined based on, for example, experiments, taking the above into account. The d-axis current instruction value id_ref is stored in the memory 540a, and the field controller 540 outputs as the d-axis current instruction value id_ref a value stored in the memory 540a.

Figure 7:
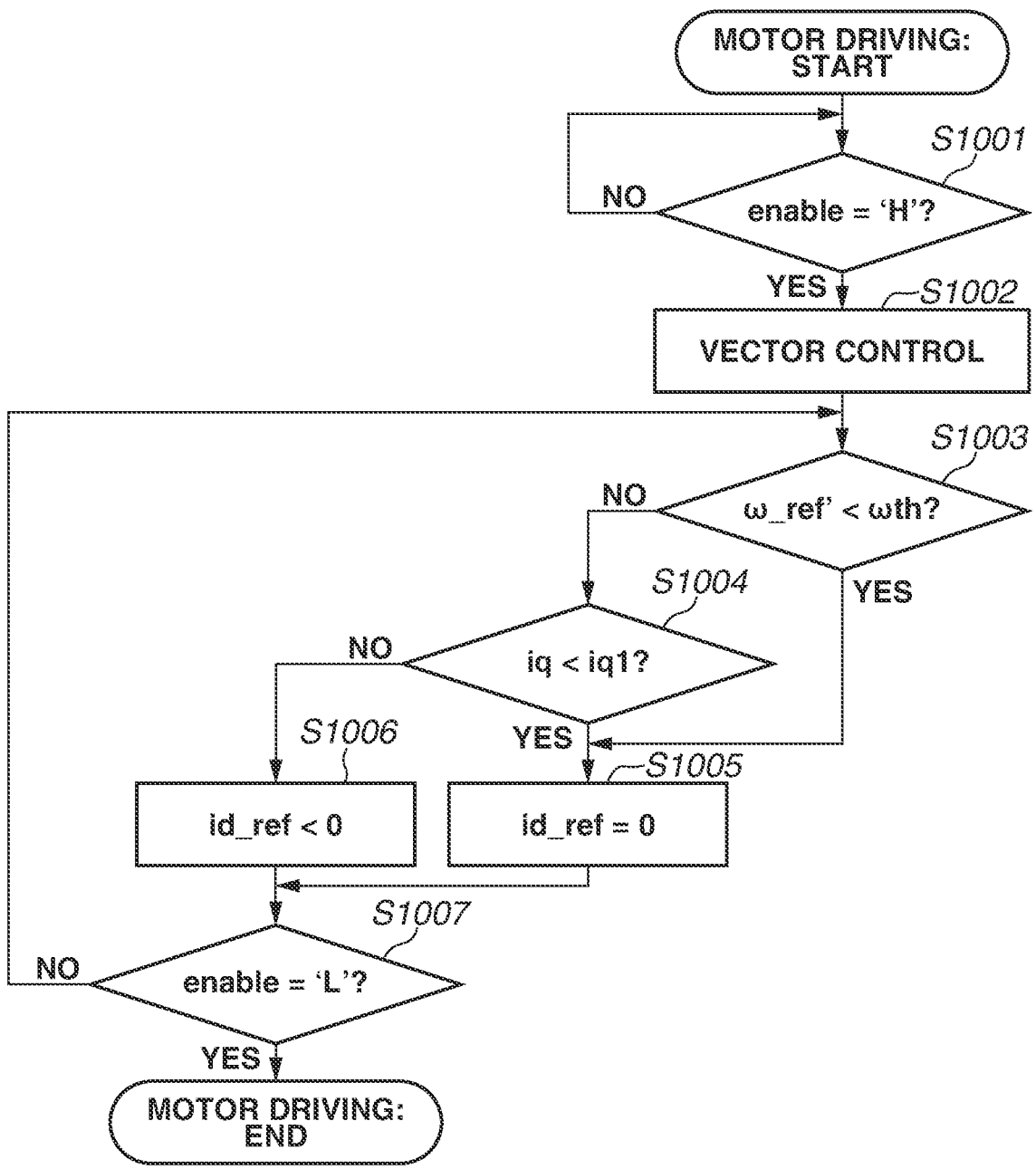
FIG. 7 is a flowchart illustrating a method for performing field weakening control.

FIG. 7 is a flowchart illustrating a method for performing field weakening control. The method for performing field weakening control will be described with reference to FIG. 7. The processing of the flowchart is executed by the CPU 151a.

In step S1001, if the CPU 151a outputs an enable signal indicating 'H' to the motor control device 157 (YES in step S1001), the motor control device 157 starts controlling the driving of the motor 509 based on an instruction output from the CPU 151a. The enable signal is a signal permitting or prohibiting the operation of the motor control device 157. If the enable signal indicates 'L (a low level)' (NO I step S1001), the CPU 151a prohibits the operation of the motor control device 157. That is, the control of the motor 509 by the motor control device 157 ends. If the enable signal indicates 'H (a high level)', the CPU 151a permits the operation of the motor control device 157, and the motor control device 157 controls the driving of the motor 509 based on an instruction output from the CPU 151a.

In step S1002, the motor control device 157 performs the vector control.

In step S1003, if the rotational velocity ω_ref is greater than or equal to the velocity threshold ωth (NO in step S1003), the processing proceeds to step S1004.

In step S1004, if the current value iq is less than the threshold iq1 (YES in step S1004), the processing proceeds to step 1005. In step S1005, the field controller 540 outputs 0 A as the d-axis current instruction value id_ref. That is, the field weakening is not performed.

In step S1004, if the current value iq is greater than or equal to the threshold iq1 (NO in step S1004), the processing proceeds to step S1006. In step S1006, the field controller 540 switches the d-axis current instruction value id_ref to be output, from 0 A to a negative value (e.g., −0.3 A). Accordingly, the field weakening is performed.

In step S1003, if the rotational velocity ω_ref is less than the velocity threshold ωth (YES in step S1003), the processing proceeds to step S1005.

From this point onward until the CPU 151a outputs the enable signal indicating 'L' to the motor control device 157 (YES in step S1007), the motor control device 157 repeatedly performs the above control, controlling the motor 509.

As described above, the field weakening is performed for the state where the field weakening needs to be performed, in the present exemplary embodiment. More specifically, the field weakening is performed for the state where the rotational velocity ω_ref of the rotor 402 is greater than or equal to the velocity threshold ωth and the load torque $T_L$ is greater than or equal to the output-possible torque T1. Accordingly, it is possible to prevent rotation of a rotor from stopping due to the fact that a load torque becomes greater than an output-possible torque. It is also possible to shorten the period during which field weakening is being performed while a motor is being driven. This enables an increase in power consumption to be prevented.

In the present exemplary embodiment, the field controller 540 switches the d-axis current instruction value id_ref by gradually changing the d-axis current instruction value id_ref. The changing method, however, is not limited to thereto. For example, the field controller 540 may directly switch the d-axis current instruction value id_ref from 0 A to −3 A. Alternatively, the field controller 540 may directly switch the d-axis current instruction value id_ref from −3 A to 0 A.

In the present exemplary embodiment, the d-axis current instruction value id_ref stored in the memory 540a is 0 A and −3.0 A. The present disclosure, however, is not limited thereto. Alternatively, three or more values may be stored. In such a case, for example, the CPU 151a outputs to the field controller 540 a signal indicating which of the values is to be used, and based on the signal, the field controller 540 switches the d-axis current instruction value id_ref to be output.

In the present exemplary embodiment, the value of the d-axis current instruction value id_ref is a value obtained in advance by, for example, experiments. The present disclosure, however, is not limited to this. For example, a configuration may be employed in which the field controller 540 changes the value of the d-axis current instruction value id_ref based on the rotational velocity ω_ref' of the rotor 402. More specifically, a configuration may be employed in which the field controller 540 sets the value of the d-axis current instruction value id_ref so that the greater the rotational velocity ω_ref' is, the smaller the value of the d-axis current instruction value id_ref is. Accordingly, it is possible to prevent an increase in an inductive voltage which generates in a winding in accordance with an increase in the rotational velocity of a rotor.

In the present exemplary embodiment, the d-axis current instruction value is set to 0 A in the state where at least one of formulas (13) and (14) is not satisfied. Alternatively, the d-axis current instruction value may be set to a value other than 0 A. More specifically, the d-axis current instruction value may only need to be a value greater than a negative value as the d-axis current instruction value set in a case where both formulas (13) and (14) are satisfied. That is, the magnetic flux through the winding in the state where at least one of formulas (13) and (14) is not satisfied may only need to be stronger than the magnetic flux through the winding in a case where both formulas (13) and (14) are satisfied. If, however, the d-axis current instruction value is set to a value as close to 0 A as possible (a value that makes the degree of the field weakening small), it is possible to effectively prevent an increase in power consumption.

The d-axis current instruction value in a case where the field weakening is performed is set to a value that enables the determination of the rotational phase of the rotor with high accuracy even if the inductive voltage which generates in the winding is reduced by performing the field weakening.

In the present exemplary embodiment, the velocity threshold ωth is set to ω0. The present disclosure, however, is not limited to this. For example, the velocity threshold ωth may be set to a value smaller than ω0, or may be set to a value greater than ω0.

In the present exemplary embodiment, the threshold iq1 is set to the current value iq corresponding to the output-possible torque T1. The present disclosure, however, is not limited to this. For example, the threshold iq1 may be set to a value smaller than the current value iq corresponding to the output-possible torque T1, or may be set to a value greater than the current value iq corresponding to the output-possible torque T1.

In the present exemplary embodiment, a stepper motor is used as the motor for driving a load. Alternatively, another motor, such as a direct current (DC) motor, may be used. The motor is not limited to a two-phase motor. The present exemplary embodiment can also be applied to another motor, such as a three-phase motor.

Figure 8:
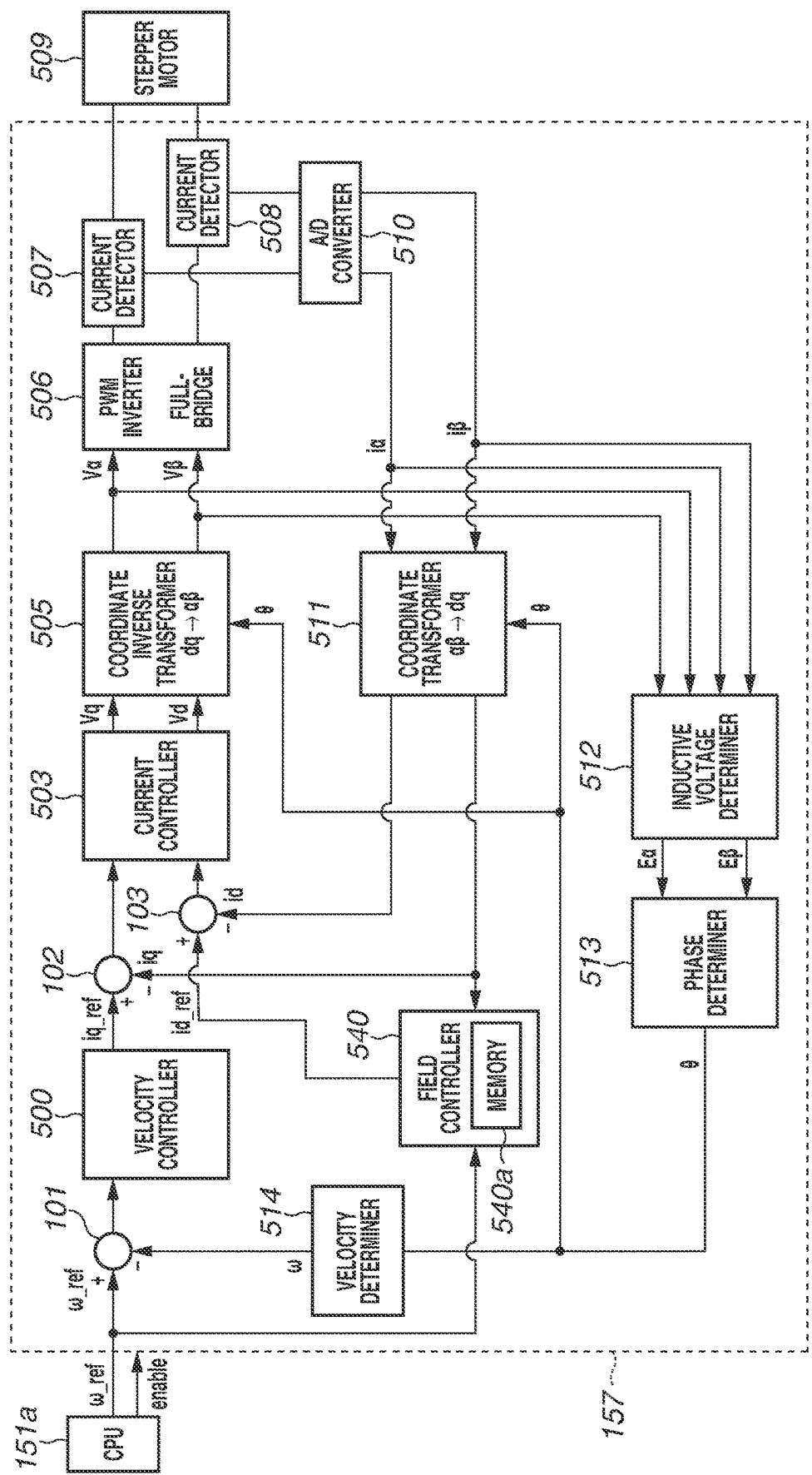
FIG. 8 is a block diagram illustrating a configuration of a motor control device that performs velocity feedback control.

In the vector control according to the present exemplary embodiment, the motor 509 is controlled by the phase feedback control being performed. The present disclosure, however, is not limited to this. For example, a configuration may be employed in which the motor 509 is controlled by the rotational velocity ω of the rotor 402 being fed back. More specifically, as illustrated in FIG. 8, a velocity controller 500 is provided within the motor control device 157, and the CPU 151a outputs the instruction velocity ω_ref representing the target velocity of the rotor 402. A velocity determiner 514 is provided within the motor control device 157, and the velocity determiner 514 determines the rotational velocity ω based on a change over time in the rotational phase θ output from the phase determiner 513. The velocity is determined using formula (12). The velocity controller 500 is configured to generate the q-axis current instruction value iq_ref so that the deviation between the rotational velocity ω and the instruction velocity ω_ref becomes small. The velocity controller 500 outputs the q-axis current instruction value iq_ref. A configuration may be employed in which the motor 509 is controlled by such velocity feedback control being performed. In such a configuration, since a rotational velocity is fed back, it is possible to perform control so that the rotational velocity of a rotor becomes a predetermined velocity. Thus, in an image forming apparatus, vector control using velocity feedback control is applied to a motor for driving a load (e.g., a photosensitive drum or a conveying belt) for which the rotational velocity needs to be controlled to be a constant velocity to appropriately form an image on a recording medium. Accordingly, it is possible to appropriately form an image on a recording medium.

In the present exemplary embodiment, a permanent magnet is used as the rotor. The present disclosure, however, is not limited to this.

According to the present disclosure, it is possible to prevent rotation of a rotor from stopping.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-077413, filed Apr. 15, 2019, which is hereby incorporated by reference herein in its entirety.

What is claimed is:

1. A motor control device comprising:
a phase determiner configured to determine a rotational phase of a rotor of a motor;
a detector configured to detect a driving current flowing through a winding of the motor; and
a controller configured to control the driving current flowing through the winding so that a deviation between a value of a torque current component of the driving current detected by the detector and a target value of the torque current component is reduced, and perform field weakening for weakening an intensity of magnetic flux through the winding by controlling a value of an excitation current component of the driving current flowing through the winding, the target value of the torque current component being set so that a deviation between an instruction phase representing a target phase of the rotor and the rotational phase determined by the phase determiner is reduced, the torque current component being a current component that is represented in a rotating coordinate system based on the rotational phase determined by the phase determiner and generates a torque in the rotor, and the excitation current component being a current component that is represented in the rotating coordinate system and influences the intensity of the magnetic flux through the winding, wherein, in a state where a value corresponding to a rotational velocity of the rotor is greater than a first predetermined value, the controller sets a degree of the field weakening to a first degree in a case where the value of the torque current component of the driving current detected by the detector is greater than a second predetermined value, and the controller sets the degree of the field weakening to a second degree smaller than the first degree in a case where the value of the torque current component of the driving current detected by the detector is smaller than the second predetermined value.

2. The motor control device according to claim 1, wherein a state where the degree of the field weakening is the second degree includes a state where the field weakening is not performed.

3. The motor control device according to claim 1, wherein the controller sets the degree of the field weakening to a third degree smaller than the first degree in a case where the value corresponding to the rotational velocity of the rotor is smaller than the first predetermined value.

4. The motor control device according to claim 3, wherein the second degree is the third degree.

5. The motor control device according to claim 1,
wherein the controller changes the degree of the field weakening by changing a target value of the excitation current component, and
wherein the controller controls the driving current flowing through the winding so that a deviation between the target value of the excitation current component and the value of the excitation current component of the driving current detected by the detector is reduced.

6. The motor control device according to claim 1, wherein the value corresponding to the rotational velocity of the rotor is a value corresponding to a target velocity of the rotor.

7. The motor control device according to claim 1, further comprising a velocity determiner configured to determine the rotational velocity of the rotor,
wherein the value corresponding to the rotational velocity of the rotor is the rotational velocity determined by the velocity determiner.

8. The motor control device according to claim 1, wherein the phase determiner determines the rotational phase of the rotor based on the driving current detected by the detector.

9. A sheet conveying apparatus comprising:
a conveying unit configured to convey a sheet;
a motor configured to drive the conveying unit; and
a motor control device configured to control the motor, the motor control device including:
a phase determiner configured to determine a rotational phase of a rotor of the motor;
a detector configured to detect a driving current flowing through a winding of the motor; and
a controller configured to control the driving current flowing through the winding so that a deviation between a value of a torque current component of the driving current detected by the detector and a target value of the torque current component is reduced, and perform field weakening for weakening an intensity of magnetic flux through the winding by controlling a value of an excitation current component of the driving current flowing through the winding, the target value of the torque current component being set so that a deviation between an instruction phase representing a target phase of the rotor and the rotational phase determined by the phase determiner is reduced, the torque current component being a current component that is represented in a rotating coordinate system based on the rotational phase determined by the phase determiner and generates a torque in the rotor, and the excitation current component being a current component that is represented in the rotating coordinate system and influences the intensity of the magnetic flux through the winding, wherein, in a state where a value corresponding to a rotational velocity of the rotor is greater than a first predetermined value, the controller sets a degree of the field weakening to a first degree in a case where the value of the torque current component of the driving current detected by the detector is greater than a second predetermined value, and the controller sets the degree of the field weakening to a second degree smaller than the first degree in a case where the value of the torque current component of the driving current detected by the detector is smaller than the second predetermined value.

10. An image forming apparatus comprising:
an image forming unit configured to form an image on a recording medium;
a motor configured to drive a load; and
a motor control device configured to control the motor, the motor control device including:
a phase determiner configured to determine a rotational phase of a rotor of the motor;
a detector configured to detect a driving current flowing through a winding of the motor; and
a controller configured to control the driving current flowing through the winding so that a deviation between a value of a torque current component of the driving current detected by the detector and a target value of the torque current component is reduced, and perform field weakening for weakening an intensity of magnetic flux through the winding by controlling a value of an excitation current component of the driving current flowing through the winding, the target value of the torque current component being set so that a deviation between an instruction phase representing a target phase of the rotor and the rotational phase determined by the phase determiner is reduced, the torque current component being a current component that is represented in a rotating coordinate system based on the rotational phase determined by the phase determiner and generates a torque in the rotor, and the excitation current component being a current component that is represented in the rotating coordinate system and influences the intensity of the magnetic flux through the winding, wherein, in a state where a value corresponding to a rotational velocity of the rotor is greater than a first predetermined value, the controller sets a degree of the field weakening to a first degree in a case where the value of the torque current component of the driving current detected by the detector is greater than a second predetermined value, and the controller sets the degree of the field weakening to a second degree smaller than the first degree in a case where the value of the torque current component of the driving current detected by the detector is smaller than the second predetermined value.

11. A motor control device comprising:
a phase determiner configured to determine a rotational phase of a rotor of a motor;
a velocity determiner configured to determine a rotational velocity of the rotor;
a detector configured to detect a driving current flowing through a winding of the motor; and
a controller configured to control the driving current flowing through the winding so that a deviation between a value of a torque current component of the driving current detected by the detector and a target value of the torque current component is reduced, and perform field weakening for weakening an intensity of magnetic flux through the winding by controlling a value of an excitation current component of the driving current flowing through the winding, the target value of the torque current component being set so that a deviation between an instruction velocity representing a target velocity of the rotor and the rotational velocity determined by the velocity determiner is reduced, the torque current component being a current component that is represented in a rotating coordinate system based on the rotational phase determined by the phase determiner and generates a torque in the rotor, and the excitation current component being a current component that is represented in the rotating coordinate system and influences the intensity of the magnetic flux through the winding,
wherein, in a state where a value corresponding to a rotational velocity of the rotor is greater than a first predetermined value, the controller sets a degree of the field weakening to a first degree in a case where the value of the torque current component of the driving current detected by the detector is greater than a second predetermined value, and the controller sets the degree of the field weakening to a second degree smaller than the first degree in a case where the value of the torque current component of the driving current detected by the detector is smaller than the second predetermined value.

12. The motor control device according to claim 11, wherein a state where the degree of the field weakening is the second degree includes a state where the field weakening is not performed.

13. The motor control device according to claim 11, wherein the controller sets the degree of the field weakening to a third degree smaller than the first degree in a case where the value corresponding to the rotational velocity of the rotor is smaller than the first predetermined value.

14. The motor control device according to claim 13, wherein the second degree is the third degree.

15. The motor control device according to claim 11, wherein the controller changes the degree of the field weakening by changing a target value of the excitation current component, and
wherein the controller controls the driving current flowing through the winding so that a deviation between the target value of the excitation current component and the value of the excitation current component of the driving current detected by the detector is reduced.

16. The motor control device according to claim 11, wherein the value corresponding to the rotational velocity of the rotor is a value corresponding to a target velocity of the rotor.

17. The motor control device according to claim 11, wherein the value corresponding to the rotational velocity of the rotor is the rotational velocity determined by the velocity determiner.

18. The motor control device according to claim 11, wherein the velocity determiner determines the rotational velocity of the rotor based on the driving current detected by the detector.

19. A sheet conveying apparatus comprising:
a conveying unit configured to convey a sheet;
a motor configured to drive the conveying unit; and
a motor control device configured to control the motor, the motor control device including:
a phase determiner configured to determine a rotational phase of a rotor of the motor;
a velocity determiner configured to determine a rotational velocity of the rotor;
a detector configured to detect a driving current flowing through a winding of the motor, and
a controller configured to control the driving current flowing through the winding so that a deviation between a value of a torque current component of the driving current detected by the detector and a target value of the torque current component is reduced, and perform field weakening for weakening an intensity of magnetic flux through the winding by controlling a value of an excitation current component of the driving current flowing through the winding, the target value of the torque current component being set so that a deviation between an instruction velocity representing a target velocity of the rotor and the rotational velocity determined by the velocity determiner is reduced, the torque current component being a current component that is represented in a rotating coordinate system based on the rotational phase determined by the phase determiner and generates a torque in the rotor, and the excitation current component being a current component that is represented in the rotating coordinate system and influences the intensity of the magnetic flux through the winding,
wherein, in a state where a value corresponding to a rotational velocity of the rotor is greater than a first predetermined value, the controller sets a degree of the field weakening to a first degree in a case where the value of the torque current component of the driving current detected by the detector is greater than a second predetermined value, and the controller sets the degree of the field weakening to a second degree smaller than the first degree in a case where the value of the torque current component of the driving current detected by the detector is smaller than the second predetermined value.

20. An image forming apparatus comprising:
an image forming unit configured to form an image on a recording medium;
a motor configured to drive a load; and
a motor control device configured to control the motor, the motor control device including:
a phase determiner configured to determine a rotational phase of a rotor of the motor;
a velocity determiner configured to determine a rotational velocity of the rotor;
a detector configured to detect a driving current flowing through a winding of the motor; and
a controller configured to control the driving current flowing through the winding so that a deviation between a value of a torque current component of the driving current detected by the detector and a target value of the torque current component is reduced, and perform field weakening for weakening an intensity of magnetic flux through the winding by controlling a value of an excitation current component of the driving current flowing through the winding, the target value of the torque current component being set so that a deviation between an instruction velocity representing a target velocity of the rotor and the rotational velocity determined by the velocity determiner is reduced, the torque current component being a current component that is represented in a rotating coordinate system based on the rotational phase determined by the phase determiner and generates a torque in the rotor, and the excitation current component being a current component that is represented in the rotating coordinate system and influences the intensity of the magnetic flux through the winding, wherein, in a state where a value corresponding to a rotational velocity of the rotor is greater than a first predetermined value, the controller sets a degree of the field weakening to a first degree in a case where the value of the torque current component of the driving current detected by the detector is greater than a second predetermined value, and the controller sets the degree of the field weakening to a second degree smaller than the first degree in a case where the value of the torque current component of the driving current detected by the detector is smaller than the second predetermined value.

* * * * *